United States Patent
Barakat et al.

(10) Patent No.: US 11,972,457 B1
(45) Date of Patent: *Apr. 30, 2024

(54) SYSTEMS AND METHODS FOR FACILITATING OPTIMAL CUSTOMER ENGAGEMENT VIA QUANTITATIVE RECEPTIVENESS ANALYSIS AND PRESENTATION

(71) Applicant: Wells Fargo Bank, N.A., San Francisco, CA (US)

(72) Inventors: Wayne Barakat, Novato, CA (US); Michael Fitzpatrick, Danville, CA (US); Mark A. Frank, San Francisco, CA (US); Yvette M. Hatton, El Cerrito, CA (US); Pey-Ning Huang, San Francisco, CA (US); Michael Lyon, Everett, WA (US); Kimberly D. Peck, San Francisco, CA (US); Melissa Schroder Viscomi, Exton, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 17/327,904

(22) Filed: May 24, 2021

Related U.S. Application Data

(63) Continuation of application No. 15/656,868, filed on Jul. 21, 2017, now Pat. No. 11,030,649.

(51) Int. Cl.
*G06Q 30/00* (2023.01)
*G06Q 30/0201* (2023.01)
(Continued)

(52) U.S. Cl.
CPC ..... *G06Q 30/0254* (2013.01); *G06Q 30/0201* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 6,567,786 B1 | 5/2003 | Bibelnieks et al. | |
| 6,925,441 B1 * | 8/2005 | Jones, III | G06Q 10/06375 |
| | | | 705/14.1 |

(Continued)

FOREIGN PATENT DOCUMENTS

| | | | | |
|---|---|---|---|---|
| JP | 2010-055320 A | 3/2010 | | |
| JP | 2010055320 A * | 3/2010 | | G06Q 50/00 |

(Continued)

OTHER PUBLICATIONS

NACB Reading. Digital Consumer Behavior Study. (Aug. 15, 2006). Retrieved online Jan. 4, 2021. https://www.zamaros.net/NACB%20READING%206.pdf (Year: 2006).*

(Continued)

*Primary Examiner* — James A Reagan
(74) *Attorney, Agent, or Firm* — Foley & Lardner LLP

(57) ABSTRACT

A financial institution computing system includes an account database with a plurality of transaction parameters with respect to a financial account of a customer, a receptiveness metrics circuit structured to extract the plurality of transaction parameters from the account database, the transaction parameters including at least one financial transaction record, and indicative of a mode of the customer, and determine one or more receptiveness metrics attributed to the customer based on the mode of the customer, the one or more receptiveness metrics indicating likelihoods of the customer converting an interaction from the financial institution, wherein the interaction includes an avatar that is an aged version of the customer, and an interaction generation circuit structured to transmit the interaction to the customer (Continued)

at an optimal time based on the one or more receptiveness metrics.

20 Claims, 4 Drawing Sheets

(51) Int. Cl.
*G06Q 30/0251* (2023.01)
*G06Q 40/02* (2023.01)

(56) References Cited

U.S. PATENT DOCUMENTS

| | | | | |
|---|---|---|---|---|
| 7,246,083 B2* | 7/2007 | Bibelnieks | ......... | G06Q 30/0254 235/383 |
| 7,349,865 B2* | 3/2008 | Fergusson | ............. | G06Q 30/02 705/7.31 |
| 7,376,603 B1* | 5/2008 | Mayr | ................. | G06Q 30/0202 705/35 |
| 8,510,658 B2* | 8/2013 | Priyadarshan | ......... | G06Q 30/02 705/14.1 |
| 8,521,786 B2* | 8/2013 | Black | ................. | G06Q 30/0269 707/802 |
| 8,539,359 B2* | 9/2013 | Rapaport | ............... | G06Q 30/02 715/767 |
| 8,732,004 B1* | 5/2014 | Ramos | ............... | G06Q 30/0255 705/14.1 |
| 8,762,193 B2* | 6/2014 | Maga | .................... | G06Q 30/02 705/7.29 |
| 9,646,325 B2* | 5/2017 | DeWitt | ................. | H04W 12/08 |
| 9,858,597 B2* | 1/2018 | DeWitt | ................. | H04W 4/021 |
| 10,250,520 B2* | 4/2019 | Imes | ........................ | H04L 47/70 |
| 10,691,726 B2* | 6/2020 | Rapaport | ............... | G06Q 30/02 |
| 10,872,322 B2* | 12/2020 | Siddique | ................ | G16H 10/60 |
| 2010/0205541 A1* | 8/2010 | Rapaport | ............... | G06Q 10/10 715/753 |
| 2010/0287048 A1* | 11/2010 | Ramer | .................... | H04W 4/21 705/14.46 |
| 2011/0302003 A1* | 12/2011 | Shirish | ............... | G06Q 10/0639 705/7.38 |
| 2012/0041817 A1* | 2/2012 | Priyadarshan | ..... | G06Q 30/0244 705/14.43 |
| 2012/0041969 A1* | 2/2012 | Priyadarshan | ......... | G06Q 30/02 707/769 |
| 2012/0042253 A1* | 2/2012 | Priyadarshan | ......... | G06Q 30/02 715/733 |
| 2013/0054758 A1* | 2/2013 | Imes | ........................ | H04L 47/70 709/219 |
| 2013/0060587 A1* | 3/2013 | Bayrak | .................. | G06Q 10/10 705/7.11 |
| 2014/0236953 A1* | 8/2014 | Rapaport | ............... | G06Q 30/02 707/740 |
| 2015/0046220 A1* | 2/2015 | Gerard | ............... | G06Q 30/0202 705/7.31 |
| 2015/0081349 A1* | 3/2015 | Johndrow | .......... | G06Q 20/3224 705/5 |
| 2015/0161563 A1* | 6/2015 | Mehrabi | .......... | G06Q 10/08355 705/338 |
| 2015/0348090 A1* | 12/2015 | Alsina | ................ | G06Q 30/0244 705/14.43 |
| 2016/0117705 A1* | 4/2016 | Robinson | ........... | G06Q 30/0205 705/7.34 |
| 2016/0210602 A1* | 7/2016 | Siddique | .................. | G06T 17/00 |
| 2016/0345176 A1* | 11/2016 | DeWitt | ............... | G06Q 30/0261 |
| 2017/0004260 A1* | 1/2017 | Moturu | .................. | G06F 19/324 |
| 2017/0228791 A1* | 8/2017 | Min | ........................ | H04L 67/10 |
| 2020/0265070 A1* | 8/2020 | Rapaport | ............... | G06Q 30/02 |
| 2021/0224765 A1* | 7/2021 | Siddique | ................ | G06Q 50/01 |

FOREIGN PATENT DOCUMENTS

| | | | | |
|---|---|---|---|---|
| WO | WO-2010/023360 A1 | 3/2010 | | |
| WO | WO-2010023360 A1 * | 3/2010 | ............ | G06Q 30/02 |
| WO | WO-2010/057195 A2 | 5/2010 | | |
| WO | WO-2010057195 A2 * | 5/2010 | ........... | G06Q 10/067 |

OTHER PUBLICATIONS

DHS. Transition Issue Paper Big Data. (Jul. 15, 2014). Retrieved online Jan. 4, 2021. https://www.dhs.gov/sites/default/files/publications/HQ%202017-HQFO-00180%20Records.pdf (Year: 2014).*

Jie Lu et al. Recommender System Application Developments: A Survey. (Apr. 6, 2015). (Retrieved online Jan. 4, 2021.) https://www.uts.edu.au/sites/default/files/desi-publication-recommender%20system%20application%20developments%20a%20survey-accepted%20menuscript.pdf (Year: 2015).*

DHS. Transition Issue Paper Big Data. (Jul. 15, 2014). Retrieved online Jan. 4, 2021. https://www.dhs.gov/sites/default/files/publications/HQ%202017-HQFO-OO 180%20Records.pdf (Year: 2014).

* cited by examiner

300

Account A

| | | |
|---|---|---|
| 2/1/2017 (7:10AM) | Public Transportation | $5.00 |
| 2/1/2017 (5:30PM) | Public Transportation | $5.00 |
| 2/2/2017 (7:10AM) | Public Transportation | $5.00 |
| 2/2/2017 (5:30PM) | Public Transportation | $5.00 |
| 2/3/2017 (6:30PM) | Online Purchase | $25.00 |
| 2/5/2017 | Purchase in the Bahamas | $40.00 |
| 2/6/2017 | Purchase in the Bahamas | $80.00 |
| 2/7/2017 | Purchase in the Bahamas | $60.00 |

SYSTEMS AND METHODS FOR FACILITATING OPTIMAL CUSTOMER ENGAGEMENT VIA QUANTITATIVE RECEPTIVENESS ANALYSIS AND PRESENTATION

CROSS-REFERENCE TO RELATED PATENT APPLICATIONS

This application is a continuation of U.S. patent application Ser. No. 15/656,868, filed Jul. 21, 2017, the contents of such application being hereby incorporated by reference in its entirety and for all purposes as if completely and fully set forth herein.

BACKGROUND

A financial institution may wish to offer financial services and products to customers in the hopes that the customer will purchase or accept the offered services or products. However, customers may be busy, inattentive, or unreceptive to incoming offers during particular times of the day or at certain locations. Accordingly, it would be desirable for a financial institution to determine an optimal time, location, channel of communication, etc. for offering a customer a financial service or product for providing an optimal chance of conversion (e.g., purchase or acceptance) of the offer.

SUMMARY

Example implementations include a financial institution computing system with an account database with a plurality of transaction parameters with respect to a financial account of a customer, a receptiveness metrics circuit structured to extract the plurality of transaction parameters from the account database, the transaction parameters including at least one financial transaction record, and indicative of a mode of the customer, and determine one or more receptiveness metrics attributed to the customer based on the mode of the customer, the one or more receptiveness metrics indicating likelihoods of the customer converting an interaction from the financial institution, wherein the interaction includes an avatar that is an aged version of the customer, and an interaction generation circuit structured to transmit the interaction to the customer at an optimal time based on the one or more receptiveness metrics.

Example implementations also include a method performed by a financial institution computing system, of extracting, by a receptiveness metrics circuit, a plurality of transaction parameters from an account database, the transaction parameters including at least one financial transaction record, and indicative of a mode of the customer, predicting, by the receptiveness metrics circuit, the mode of the customer based on the extracted transaction parameters and at least one of a location of the customer and a mode of transportation associated with the financial transaction record, determining, by the receptiveness metrics circuit, one or more receptiveness metrics attributed to the customer based on the mode of the customer, the one or more receptiveness metrics indicating likelihoods of the customer converting an interaction from the financial institution, wherein the interaction includes an avatar that is an aged version of the customer, determining, by the receptiveness metrics circuit, a confidence level for the mode of the customer based whether one or more of the plurality of transaction parameters confirm or disprove the predicted behavior, and transmitting, by an interaction generation circuit, the interaction to the customer at an optimal time based on the one or more receptiveness metrics.

Example implementations also include a non-transitory computer readable media having computer-executable instructions embodied therein that, when executed by a receptiveness metrics circuit and an interaction generation circuit of a financial institution computing system, causes the financial institution computing system to perform operations, the operations including extracting, by the receptiveness metrics circuit, a plurality of transaction parameters from an account database, the transaction parameters including at least one financial transaction record, and indicative of a mode of the customer, predicting, by the receptiveness metrics circuit, the mode of the customer based on the extracted transaction parameters and at least one of a location of the customer and a mode of transportation associated with the financial transaction record, determining, by the receptiveness metrics circuit, one or more receptiveness metrics attributed to the customer based on the mode of the customer, the one or more receptiveness metrics indicating likelihoods of the customer converting an interaction from the financial institution, where the interaction includes an avatar that is an aged version of the customer, determining, by the receptiveness metrics circuit, a confidence level for the mode of the customer based whether one or more of the plurality of transaction parameters confirm or disprove the predicted behavior, and transmitting, by the interaction generation circuit, the interaction to the customer at an optimal time based on the one or more receptiveness metrics.

DETAILED DESCRIPTION

Figure 1:
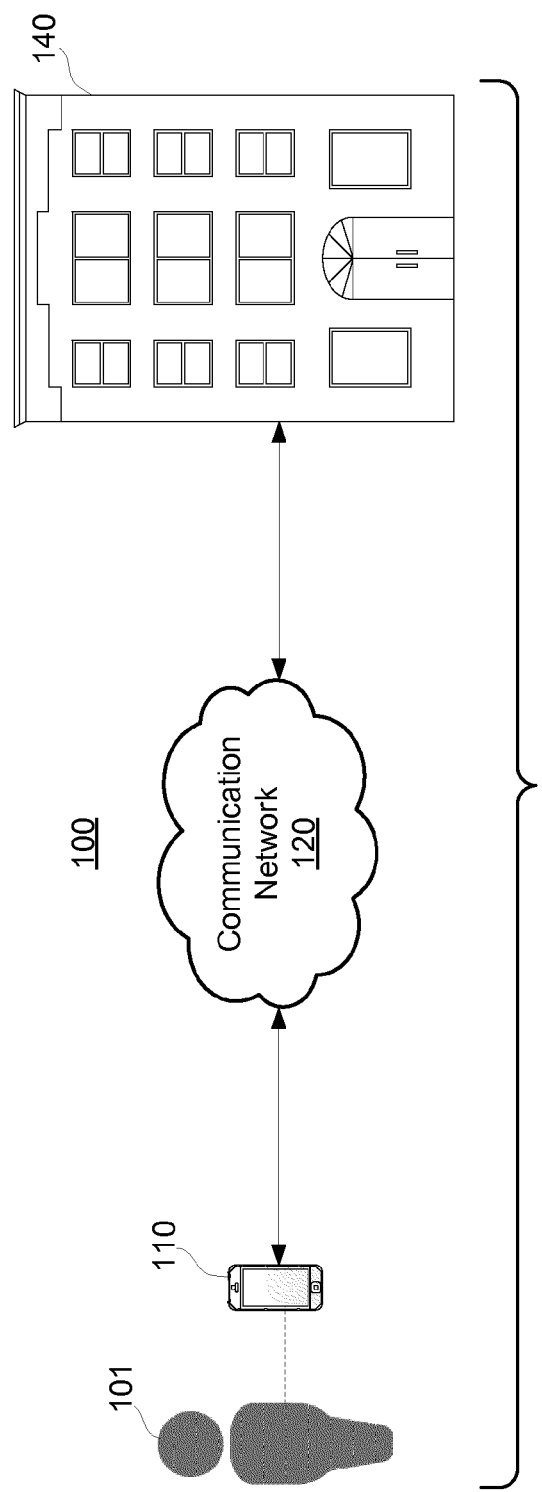
FIG. 1 is a block diagram illustrating a system for determining customer receptiveness metrics according to some embodiments.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting. For example, various embodiments of systems and methods discussed herein may be relevant to any of a variety of circumstances where determining customer receptiveness metrics for a customer may be useful.

The frequency for which individuals are exposed to offers to buy goods and services has increased over time. Several factors have contributed to the increase in offer frequency, such as the proliferation of technology and the internet, which have reduced the cost of providing offers for goods and services and have improved the relevance of the offers provided to particular individuals. One byproduct of increased exposure to offers is "consumer fatigue." Consumers tend to filter or simply "tune out" offers once they have reached their mental capacity to analyze additional offers. Online and offline communication channels can both contribute to "tune out."

Certain companies provide offers to existing customers. For example, a bank may provide an offer for loan refinancing to an existing demand deposit account ("DDA") holder. However, companies providing offers to customers must take care to limit the quantity and content of offers provided to existing customers so as to avoid consumer fatigue in response to the offer. If customers become annoyed by offers from a particular company, they may cease communication and/or business with the company. Therefore, excessive and/or irrelevant offers can have the opposite effect of their intention by decreasing rather than increasing the amount of business done with a customer.

The number of non-cash financial transactions that individuals engage in per day has increased over time. For example, individuals increasingly perform transactions using a credit card, debit card, mobile wallet, cryptocurrency wallet, stored value card, or via an in-app payment system. In addition, individuals increasingly conduct a larger number of discrete payments at smaller amounts due to, for example, decreased friction in using payment devices. For example, credit card payments are processed faster due to faster network speed. In addition, near field communication ("NFC") enables contactless payments from payment devices (e.g., credit cards, smart phones operating mobile wallets, etc.). Therefore, there currently exists a more comprehensive record of financial transactions performed by individuals than previously available.

In various embodiments, systems and methods for determining customer receptiveness metrics are discussed herein. A financial institution may desire to determine one or more receptiveness metrics that incorporate a time of day, location, customer mode (e.g., leisure mode, work mode, etc.), channel of communication, and the like, for a particular customer, that is optimal for sending the customer an offer for a financial product or service of the financial institution such that the customer has a relatively high probability of converting (e.g., purchasing or accepting) the offer. Accordingly, in some embodiments, the financial institution can determine when, where, through what channel of communication, and the like to send an offer such that likelihood of conversion by the customer is optimized.

In some embodiments, the receptiveness metric of a customer is based on financial characteristics of the customer. For example, the receptiveness metric can be based on financial transactions of the customer. In some embodiments, the receptiveness metric of a customer is based on other characteristics of the customer including, but not limited to, technical savviness, financial situation, customer actions, and so on.

In some embodiments, a customer's financial transactions with a plurality of merchants are analyzed to determine, in real-time or near real-time, one or more receptiveness metrics corresponding to one or more of, for example, but not limited to, a time of day, location of the customer, mode of the customer, (e.g., leisure mode, work mode, etc.), channel of communication between the financial institution and the customer, and the like, for optimizing offers provided to customers. The receptiveness metrics are determined for each individual customer based on financial transactions performed by that customer. For example, in some embodiments, a customer's financial transactions are analyzed to predict one or more current behavioral conditions of the customer. Current behavioral conditions of a customer may include, for example, a physical location of the customer (e.g., at home, work, in a public location, etc.), a current activity performed by the customer (e.g., working, eating, commuting, socializing, relaxing, sleeping, etc.), environmental conditions near the customer (e.g., whether the customer is in a private or public setting, in an area with high or low ambient noise, etc.), a communication device accessible by the customer (e.g., smart phone, computer, home or desk phone, smart watch, etc.), among other factors. For example, in some embodiments, the financial institution uses known characteristics of one or more transaction to predict a behavioral condition of a customer. Characteristics of a transaction include, but are not limited to, merchant name, transaction amount, tax amount, transaction date and time, customer code, purchase order number, merchant location (e.g., zip code), item product code, item description, item quantity, and the like.

As an example, the financial institution can analyze a merchant name of a transaction to determine a behavioral condition of the customer based on a merchant category associated with the merchant name. For instance, the merchant name can be cross-referenced with a database of merchant names that further include identifiers corresponding to merchant categories associated with the merchant names (e.g., a financial transaction including a name of a restaurant is associated with a restaurant category or a financial transaction including a name of a public transit system is associated with a public transportation category). Furthermore, in some embodiments, the financial institution determines a behavioral condition of the customer based on the determined merchant category. For example, if the financial institution detects a public transportation merchant category (e.g., and the transaction occurred in the morning), the financial institution can determine that the customer is likely unavailable and unresponsive for a period of time (e.g., for the rest of the day) because the customer is likely commuting to work.

Accordingly, determining receptiveness metrics for a customer and sending offers to the customer based on the receptiveness metrics to catch the customer at an optimal time and location for increasing the likelihood that the customer will purchase or accept the offer allows a financial institution to increase sales and use of financial services and products offered by the financial institution. As such, according to various embodiments, customer user experience is improved due to customers partaking in services pertinent to their needs and the financial institution is able to increase sales or general use of its financial services and products. In addition, by sending offers at an optimal time, rather than sending offers at random times or without much analysis as to an optimal time, the financial institution conserves computing resources by focusing on quality of the timing of offers rather than quantity (e.g., the financial institution sending an offer at one optimal time during a week as opposed to sending the same offer multiple times during the week), and conserves network resources that are used to transmit offers (e.g., freeing up the network resources for other operations, and therefore providing reduced latency of the network). Accordingly, the embodiments described herein solve the technical and internet-centric problems of optimizing timing of offers sent by a financial institution to customers and increasing probabilities that the customers will accept or purchase the offers due to the optimal timing.

In particular, one problem with existing targeted marketing systems is determining an optimal time to provide an offer to a customer. Existing systems attempt to determine an optimal time to contact a customer based on general behavior characteristics of other individuals. One problem with this approach is that many individuals do not conform with general customer behavioral characteristics. Even if the sample that is analyzed is selectively chosen based on various characteristics of the customer, there remains a high probability that the customer does not conform with the general behavioral characteristics. The instant systems and methods for facilitating optimal customer engagement determine an optimal time and mode to provide an offer to a customer based on financial transactions performed by the customer. Therefore, the optimal time and mode determined by the instant systems and methods are specifically tailored to the customer to which the offer is provided. Therefore, the instant systems and methods enable offers to be optimized to particular customers to maximize the likelihood that the customer will be receptive to the offer.

In addition, another problem with existing targeted marketing systems is ensuring that the data relied upon to optimize offers is timely and relevant to a customer's current conditions. For example, certain existing targeted marketing systems analyze past purchases with a particular company to attempt to optimize content and timing of offers. However, customers' past behavior may not be indicative of their current behavior. Various embodiments optimize mode and timing of offers in real-time or near real-time based on purchases made by a customer immediately before (e.g., within 30 minutes) contacting the customer for the offer. Therefore, the instant systems and methods enable offers to reflect recent circumstances and characteristics of customers to maximize the likelihood that the customer will be receptive to the offers due to relevant timing and content of sent offers.

Furthermore, another problem with existing systems is that they consider only past purchases made by the customer with the company providing an offer. In contrast, various embodiments relate to optimizing the mode and content of offers based on past purchases made by the customer with several companies. Therefore, the instant systems and methods provide a more complete understanding of the customer's behavior to allow the financial system to provide more relevant and timely offers.

FIG. 1 is a diagram of an example of a system 100 for determining receptiveness metrics for a customer 101 of a financial institution 140 according to some arrangements. Referring to FIG. 1, the customer 101 is an account holder of at least one financial account at the financial institution 140. The customer 101 is associated with a user device 110. That is, the customer 101 can use the user device 110 to access financial products and/or services provided by the financial institution 140. Particularly, the customer 101 can access a financial account (e.g., a credit card account, a checking account, a savings account, a brokerage account, and so on) held with the financial institution 140 and can perform various operations with respect to the financial account (e.g., transfer funds, access transaction history, pay credit card balance, and so on).

The user device 110 is connected to the financial institution 140 (e.g., a financial institution computing system 242 of FIG. 2) via a communication network 120. The communication network 120 is any suitable Local Area Network (LAN) or Wide Area Network (WAN). For example, the communication network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (lx), General Packet Radio Service (GPRS), Personal Communications Service (PCS), 802.11X, ZigBee, Bluetooth, Wi-Fi, any suitable wired network, combination thereof, and/or the like. The communication network 120 is structured to permit the exchange of data, values, instructions, messages, and the like between the user device 110 and the financial institution 140 (e.g., a financial institution computing system 242 of FIG. 2).

Figure 2:
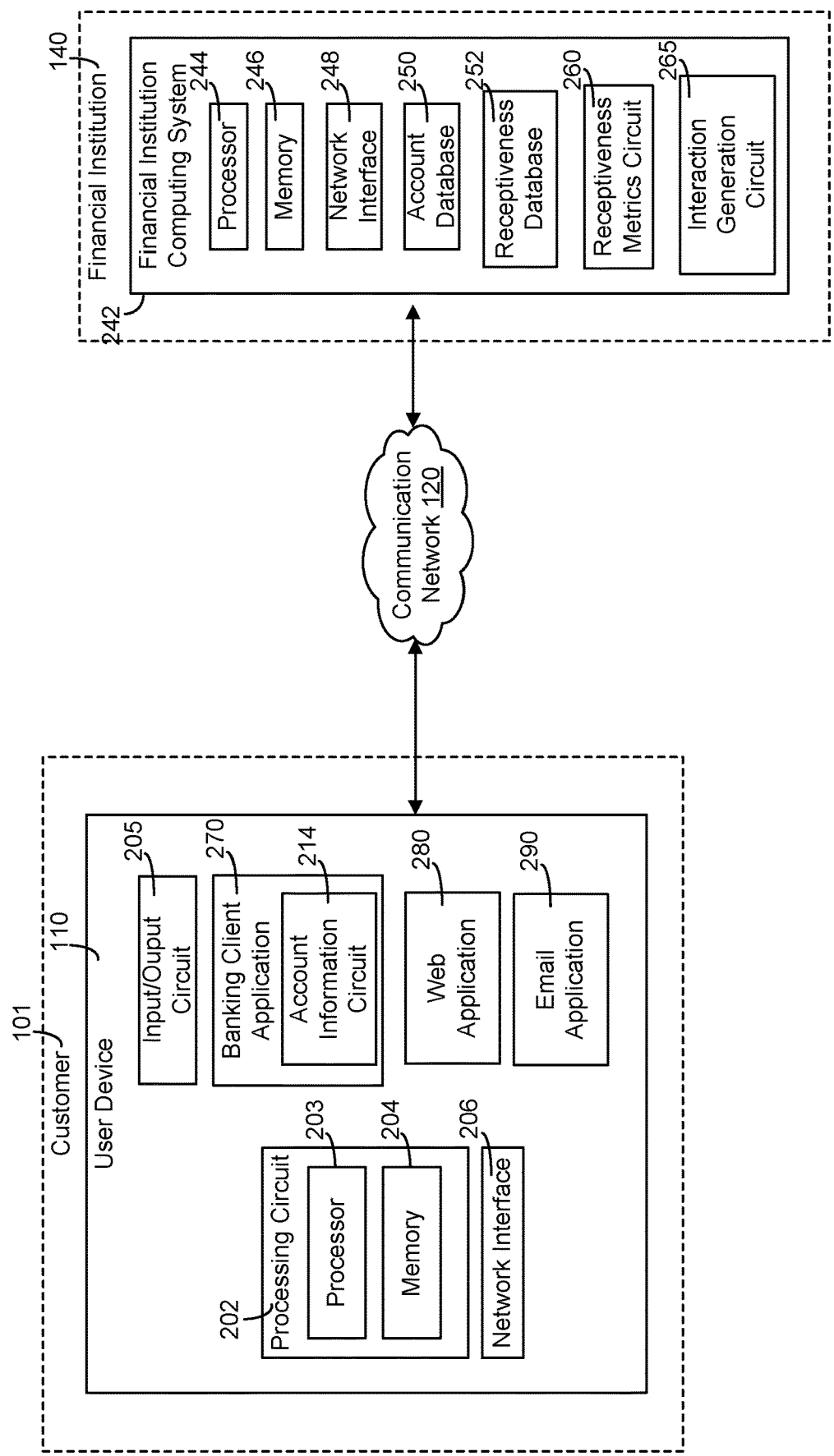
FIG. 2 is a block diagram illustrating an example of the system for determining customer receptiveness metrics shown in FIG. 1 according to some embodiments.

FIG. 2 is a diagram of an example of the user device 110 and an example of the financial institution 140 in the system 100 set forth in FIG. 1 according to some arrangements. Referring now to FIGS. 1-2, the financial institution 140 includes one or more of a bank branch, loan office, mortgage office, financial services office, retail office, automatic teller machine (ATM) location, a combination thereof, and/or the like. The financial institution 140 has at least one associated financial institution computing system 242.

The financial institution 140 provides financial products and services such as, but not limited to, credit card accounts, checking/saving accounts, retirement accounts, mortgage accounts, loan accounts, investment and financial accounts, and the like to the customer 101 via the financial institution computing system 242. The financial institution computing system 242 includes a processor 244 and a memory device 246. The processor 244 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 246 (e.g., Random Access Memory (RAM), Read-Only Memory (ROM), Non-volatile RAM (NVRAM), Flash Memory, hard disk storage, etc.) stores data and/or computer code for facilitating at least some of the various processes described herein. The memory 246 is or includes tangible, non-transient volatile memory or non-volatile memory. In this regard, the memory 246 stores programming logic that, when executed by the processor 244, controls the operations of the financial institution computing system 242. In some arrangements, the processor 244 and the memory 246 may form various processing circuits described with respect to the financial institution computing system 242 (e.g., receptiveness metrics circuit 260 and interaction generation circuit 265).

As shown, the financial institution computing system 242 includes a network interface 248. The network interface 248 is structured for sending and receiving of data over the communication network 120 (e.g., to and from the user device 110, etc.). Accordingly, the network interface 248 includes any of a cellular transceiver (for cellular standards), local wireless network transceiver (for 802.11X, ZigBee, Bluetooth, Wi-Fi, or the like), wired network interface, combination thereof (e.g., both a cellular transceiver and a Bluetooth transceiver), and/or the like.

The financial institution computing system 242 includes an account database 250 that stores customer information and account information relating to one or more accounts held by the customer 101 with the financial institution 140. The account database 250 stores transaction history of transactions made by the customer 101 using one or more accounts of the customer 101, for example, with the banking client application 270 or with other suitable methods. The transaction information for each transaction includes one or more of a transaction amount, transaction time, parties of the transaction, location of transaction, or the like.

The financial institution computing system 242 includes a receptiveness database 252. The receptiveness database 252 is configured to store a plurality of receptiveness metrics associated with the customer 101. In some embodiments, a receptiveness metric is a numerical score (e.g., from 0-100) that indicates a level of receptiveness for the customer 101, and the higher the score is the higher the receptiveness of the customer 101 may be. Each receptiveness metric can be associated with one or more of a time of day, a location of the customer 101, a mode (e.g., leisure mode, work mode, etc.) of the customer 101, a channel of the communication, and so on. For example, when the customer 101 is at the office for work, the receptiveness metric stored in the receptiveness database 252 and associated with the customer's place of work, or with the customer 101 being in a work mode, may be relatively low (e.g., because the customer 101 is thought of as being busy), while the receptiveness metric stored in the receptiveness database 252 and associated with the customer's place of leisure (e.g., the customer's home), or with the customer 101 being in a leisure mode, may be relatively high (e.g., because the customer 101 is thought to be relaxed and therefore more receptive).

The financial institution computing system 242 includes a receptiveness metrics circuit 260. The receptiveness metrics circuit 260 is capable of determining receptiveness metrics for the customer 101. The receptiveness metrics circuit 260 is operatively coupled to one or more of the components of the financial institution computing system 242. For example, the receptiveness metrics circuit 260 is coupled to the account database 250 to access information stored thereon with respect to the transaction history of the customer 101 to determine the receptiveness metrics for the customer 101. As another example, the receptiveness metrics circuit 260 is coupled to the receptiveness database 252 to write, modify, or delete receptiveness metrics stored thereon with respect to the customer 101 after determining the receptiveness metrics. In some examples, the receptiveness metrics circuit 260 is implemented with the processor 244. For example, the receptiveness metrics circuit 260 is implemented as a software application stored within the memory 246 and executed by the processor 244. Accordingly, such examples can be implemented with minimal or no additional hardware costs. However, other implementations rely on dedicated hardware specifically configured for performing operations of the receptiveness metrics circuit 260.

In some embodiments, the receptiveness metrics circuit 260 is configured to determine one or more different receptiveness metrics with respect to the customer 101. For example, one or more receptiveness metrics incorporates a time of day, location, customer mode (e.g., leisure mode, work mode, etc.), a channel of communication, and the like, for the customer 101, that is an indicator of how receptive (e.g., likelihood of converting an offer from the financial institution 140) the customer 101 is to an interaction from the financial institution 140. Accordingly, in some embodiments, the receptiveness metrics circuit 260 determines when, where, through what channel of communication, and the like to initiate an interaction such that likelihood of conversion by the customer 101 is optimized.

The receptiveness metrics circuit 260 determines the likelihood that the customer 101 will be receptive to an offer based on the channel of communication through which the offer is presented to the customer 101. Channels of communication can be either offline or online. For example, offline channels of communication may include direct mail, telephone (in-bound or out-bound, including text and/or voice), in-person interactions, etc. Online channels of communication can include digital advertising (e.g., via the website or web application 280 of the financial institution 140 or via third-party websites or web applications), chat, email, video, etc.), social media posts, push notifications, etc. For example, the receptiveness metrics circuit 260 may determine, in response to the customer 101 signing into the web application 280 that the customer 101 would likely be receptive to in-application chat communication. In some embodiments, the receptiveness metrics circuit 260 analyzes customer activity in real-time or near real-time to determine receptiveness metrics for online channels of communication.

In some embodiments, receptiveness metrics can be based on financial transactions of the customer. In some embodiments, the receptiveness metrics circuit 260 accesses the account database 250 and parses and interprets transactions made by the customer 101 to determine the receptiveness metric of the customer 101. The receptiveness metrics circuit 260 can be configured to identify and extract characteristics of transactions made by the customer 101, such as, but not limited to, transaction type (e.g., credit card, debit card, etc.), time, location, parties involved, amount, and so on, and the receptiveness metrics circuit 260 can determine a receptiveness metric based on the extracted transaction characteristics.

In some embodiments, the receptiveness metrics circuit 260 determines a receptiveness metric with respect to a time of day for interacting with the customer 101 based on the extracted transaction characteristics of the customer 101. As an example, the receptiveness metrics circuit 260 can determine that the customer 101 typically purchases a public transportation ticket every morning of each weekday. Accordingly, the receptiveness metrics circuit 260 can determine that the customer 101 is likely commuting to work during this time, and can therefore attribute a receptiveness metric having a relatively low score to this time of day (e.g., weekday mornings), as the customer 101 will likely not be receptive to interactions from the financial institution 140 during this time since the customer 101 is likely busy.

In some embodiments, the receptiveness metrics circuit 260 determines a receptiveness metric with respect to a likely location of the customer 101. For example, a likely location of the customer 101 can be determined based on the financial transaction made by the customer 101. In some embodiments, the location of the customer 101 dictates the receptiveness metric (e.g., when the customer 101 is at home, the receptiveness metric may be higher than when the customer 101 is at the office). As an example, if the receptiveness metrics circuit 260 determines that the customer 101 purchases a public transportation ticket in the morning and another ticket in the evening, the receptiveness metrics circuit 260 can determine that the customer 101 is likely returning home in the evening, and can attribute a relatively high receptiveness metric while the customer 101 is at home. Similarly, the receptiveness metrics circuit 260 can attribute a relatively low receptiveness metric for when the customer 101 is likely at the office (e.g., during the day on a weekday).

In some embodiments, the receptiveness metrics circuit 260 determines a receptiveness metric with respect to a mode of the customer 101. In some embodiments, the mode of the customer 101 can be characterized as, for example, a work mode, a leisure mode, a vacation mode, a stressed mode, and so on. As an example, based on the financial transactions with respect to the purchase of public transportation tickets, the receptiveness metrics circuit 260 can determine the customer 101 to be in a work mode (e.g., during the day on a weekday) and attribute a relatively low scoring receptiveness metric while the customer 101 is in work mode. As an example, the receptiveness metrics circuit 260 can analyze a merchant name of a transaction to determine a behavioral condition of the customer 101 based on a merchant category associated with the merchant name. For instance, the merchant name can be cross-referenced with a database of merchant names that further include identifiers corresponding to merchant categories associated with the merchant names (e.g., a public transit system is associated with a public transportation category). Furthermore, in some embodiments, the financial institution determines a behavioral condition of the customer 101 based on the determined merchant category. For example, if the receptiveness metrics circuit 260 detects a public transportation merchant category (e.g., and the transaction occurred in the morning), the receptiveness metrics circuit 260 can determine that the customer 101 is likely unavailable and unresponsive for a period of time (e.g., for the rest of the day) because the customer 101 is likely commuting to work. Similarly, after the customer 101 is likely off of work, the receptiveness metrics circuit 260 can determine that the customer 101 is in a leisure mode, and can therefore attribute a relatively high receptiveness metric to the customer 101 that is in the leisure mode (e.g., since the customer 101 is more likely to be receptive to an interaction from the financial institution when in the leisure mode). As another example, the receptiveness metrics circuit 260 determines that the customer 101 is on vacation (e.g., based on a number of financial transactions that occur away from the residential address of the customer 101, which can be associated with the account of the customer 101 and stored in the account database 250 for extraction by the receptiveness metrics circuit 260) and therefore in a vacation mode, and can thus attribute a relatively low receptiveness metric to the customer 101 that is on vacation. As another example, the receptiveness metrics circuit 260 can determine that the customer 101 is in a stressed mode, for example, by the account of the customer 101 showing one or more overdraft fees, full or near-full usage of the credit line of the customer, one or more transactions indicating a negative life event (e.g., payments of medical bills, funeral costs, and so on), and more. Accordingly, the receptiveness metrics circuit 260 can attribute a relatively low receptiveness metric when the customer 101 is determined to be in a stressed mode.

In some embodiments, the receptiveness metric of the customer 101 is based on other characteristics of the customer including, but not limited to, technical savviness, financial situation, customer actions, and so on. For example, technical savviness can be determined by the receptiveness metrics circuit 260, which can attribute a receptiveness metric associated with a channel of communication with the customer 101. In some embodiments, the more technical savvy the customer 101 is determined to be, the more technical the channel of communication can be used for the interaction from the financial institution 140. For example, the receptiveness metrics circuit 260 can determine a browser, browser version, operating system of the user device 110, or version of the operating system of the user device 110 used by the customer 101 when the customer 101 logs into a website (e.g., via web application 280) of the financial institution 140, and the more advanced the browser or operating system is or up to date the version is, the more technical savvy the customer 101 can be deemed. As another example, the customer 101 can be determined to be relatively technically savvy if the customer 101 accesses their account via a mobile application (e.g., through banking client application 205) associated with the financial institution 140. However, if the customer 101 is determined to only contact the financial institution 140 at a physical branch or by telephone, the customer 101 can be determined to be relatively technically unsavvy. In some embodiments, the receptiveness metrics circuit 260 determines the technical savviness of the customer 101 based on the transaction history of an account of the customer 101. For example, if the customer 101 primarily shops at physical retail shops, with little to no online transactional presence, then the customer 101 can be deemed to be relatively technically unsavvy. In some embodiments, the receptiveness metrics circuit 260 determines whether a particular transaction of an account of the customer 101 is at retail store or an online transaction by the credit card signature of a credit card payment (e.g., a credit card purchase at a retail store has a different signature line from a purchase at an online store).

Accordingly, in response to determining the technical savviness of the customer 101, the receptiveness metrics circuit 260 can attribute receptiveness metrics to one or more channels of communication between the financial institution 140 and the customer 101. In particular, the more technically savvy the customer 101 is, the higher the receptiveness metric for the more technical channels of communication (e.g., online channels) is attributable by the receptiveness metrics circuit 260, and vice versa. For example, if the customer 101 is determined to be technically savvy, the receptiveness metrics circuit 260 can attribute a relatively high receptiveness metric to a mobile application of the financial institution 140, to email, and/or to other digital advertising systems, as modes of communication for an interaction by the financial institution 140. Conversely, if the customer 101 is determined to not be technically savvy, the receptiveness metrics circuit 260 can attribute a relatively high receptiveness metric to in-person and telephonic modes of communication for an interaction by the financial institution 140.

In addition, in some embodiments, the receptiveness metric of the customer 101 is based on the financial situation of the customer 101. For example, if the customer 101 is determined to be in a poor financial situation (e.g., indicated by one or more overdraft fees charged to the account of the customer 101, high credit use, multiple high amount transactions, high loans, and so on), the receptiveness metrics circuit 260 can attribute a relatively low receptiveness metric to the customer 101, as the customer 101 may not be in any financial situation to accept offers of further financial products or services. Conversely, if the customer is determined to be in a good financial situation, the receptiveness metrics circuit 260 can attribute a relatively high receptiveness metric to the customer 101, as the customer 101 may be in a good enough financial situation to accept offers of further financial products or services.

In some embodiments, the receptiveness metric of the customer 101 is based on the actions of the customer 101. For example, the transaction history of the customer 101 can indicate to the receptiveness metric circuit 260 whether the customer 101 is in a state of mind to be receptive to an interaction from the financial institution 140. For example, if the customer 101 is exhibiting recent actions of spending a lot of money in a short period of time, the customer 101 can be determined to be in a state in which they are receptive to offers from the financial institution 140 (e.g., the receptiveness metric circuit 260 can attribute a relatively high receptiveness metric to the customer 101), as the customer 101 appears to be in a financially open state (e.g., being free with their money). Conversely, if the customer 101 has not spent much money via their account over a certain period of time, the receptiveness metrics circuit 260 can determine the customer 101 to be in a financially conservative state, and therefore not be receptive to an interaction from the financial institution 140 (e.g., the receptiveness metric circuit 260 can attribute a relatively low receptiveness metric to the customer 101).

In some embodiments, the various receptiveness metrics associated with the customer 101 (e.g., time of day, location of the customer 101, mode of the customer 101, channel of communication, and so on) can be combined to determine an overall receptiveness metric for the customer 101 by the receptiveness metrics circuit 260. In some embodiments, the receptiveness metrics circuit 260 weights the different individual receptiveness metrics differently based on the relative importance of the individual receptiveness metrics in determining the overall receptiveness metric for the customer 101. For example, the receptiveness metrics circuit 260 can be configured to place a relatively high weight on the customer 101 being in a vacation mode, as no matter the other individual receptiveness metrics (e.g., the time of day or channel of communication), the customer 101 will likely be unreceptive to an interaction from the financial institution 140 while on vacation. As another example, the receptiveness metrics circuit 260 can be configured to place a relatively weight on the channel of communication receptiveness metric of the customer. For example, if the customer 101 is determined to only interact with the financial institution 140 over the telephone, the overall receptiveness metric can be relatively low, except for when the customer 101 is determined to have access to a telephone (e.g., when at home).

In some embodiments, the receptiveness metrics circuit 260 is structured to determine a predicted behavior of the customer based on one or more of the analyzed transactions of the customer 101. For example, the receptiveness metrics circuit 260 can extract characteristics of a transaction including, but not limited to, merchant name, transaction amount, tax amount, transaction date and time, customer code, purchase order number, merchant location (e.g., zip code), item product code, item description, item quantity, and the like, and determine a predicted behavior of the customer 101 based on one or more of the extracted characteristics. For example, the receptiveness metrics circuit 260 can cross-reference a merchant name associated with one or more of the plurality of transaction parameters with stored identifiers to determine a merchant category of the plurality of transaction parameters identified by the stored identifiers to determine a predicted behavior, and then can determine one or more receptiveness metrics attributed to the customer 101 based on the predicted behavior. As an example, the extracted characteristics can indicate that the customer 101 engaged in a transaction with a public transportation company (e.g., identified by stored identifiers at the financial institution computing system 242), and can therefore determine a predicted behavior that the customer 101 is commuting to work and will be working during the day (e.g., if a time characteristic of one or more transactions indicates that the transaction occurred in the morning).

In some embodiments, the receptiveness metrics circuit 260 is structured to attribute a confidence level to a determined predicted behavior based on a level of confirmation that recent ones of the plurality of transaction parameters confirm or disprove the predicted behavior. For example, if the receptiveness metrics circuit 260 predicts that the customer 101 is commuting to work, the receptiveness metrics circuit 260 can attribute a relatively high confidence level to this prediction if the customer 101 makes another purchase on a commuter train near to and after the time of purchase of a public transportation ticket. On the other hand, the receptiveness metrics circuit 260 can attribute a relatively low confidence level to this prediction if the customer 101 begins making purchases at a movie theater near to and after the time of purchase of the public transportation ticket.

The financial institution computing system 242 includes an interaction generation circuit 265. The interaction generation circuit 265 is capable of generating one or more offers for the customer 101 or otherwise capable of initiating an interaction with the customer 101. The interaction generation circuit 265 is operatively coupled to one or more of the components of the financial institution computing system 242. For example, the interaction generation circuit 265 is coupled to the network interface 248 for communicating with the user device 110 via the communication network 120. In some embodiments, the interaction generation circuit 265 is coupled to the receptiveness database 252 to access information stored thereon with respect to receptiveness metrics of the customer 101 for instigating an interaction with the customer 101 at an optimal time or customer location based on the associated receptiveness metrics. In some examples, the interaction generation circuit 265 is implemented with the processor 244. For example, the interaction generation circuit 265 is implemented as a software application stored within the memory 246 and executed by the processor 244. Accordingly, such examples can be implemented with minimal or no additional hardware costs. However, other implementations rely on dedicated hardware specifically configured for performing operations of the interaction generation circuit 265.

In some embodiments, the interaction generation circuit 265 is configured to generate one or more offers for the customer 101 or is otherwise configured to instigate an interaction with the customer 101. The interaction generation circuit 265 is configured to generate the interaction at an optimal time of reaching the customer 101 based on one or more of the receptiveness metrics of the customer 101. For example, if the receptiveness metric of the customer 101 indicates that the customer 101 is most receptive at night time on a weekday (e.g., because the customer 101 is in a leisure mode or at home), the interaction generation circuit 265 can wait to generate an interaction at this time.

In some embodiments, the interaction is any form of communication between the financial institution 140 and the customer 101. For example, the interaction can be an offer for a financial product or service (e.g., a type of financial account, an investment, a bill pay service, and the like). The offer can be communicated through various channels of communication, depending on the receptiveness metric of the customer 101 with respect to channels of communication. For example, the offer can be sent from the financial institution 140 to the customer 101 through the banking client application 270, the web application 280, the email application 290, telephonically (e.g., through a cell phone or a land line), by mail, in-person (e.g., when the customer 101 visits a physical location of the financial institution 140), and the like.

In some embodiments, the interaction generation circuit 265 can determine the type of offer to be sent to the customer 101, in addition to an optimal time of sending the offer, based on one or more receptiveness metrics of the customer 101. For example, if the customer 101 is in a vacation mode and therefore has a relatively low receptiveness index for a prolonged period of time, the interaction generation circuit 265 can generate an interaction related to a savings account for sending when the receptiveness metric of the customer 101 is relatively high, since the customer 101 has likely spent a lot of money while on vacation. As another example, the receptiveness metrics circuit 260 determines that a credit history of the customer 101 has been pulled (e.g., based on activity of an account of the customer 101 stored in the account database 250), and as such, the interaction generation circuit 265 can provide an interaction (e.g., offer) for a financial product that relates to a credit pull (e.g., the credit pull indicates that the customer 101 is purchasing a vehicle or a home, and therefore the interaction generation circuit 265 provides a related offer, such as, offering a home equity credit or the like). It should be noted that a hard pull may first require customer approval.

In some embodiments, the interaction generation circuit 265 can track which offers have been sent to the customer 101 already, such that the customer 101 does not receive the same offer twice. Similarly, the interaction generation circuit 265 can keep track of which channels of communication have been used to contact the customer 101 with an offer, and can accordingly use a different channel of communication for sending the same offer, such that the customer 101 receives the same offer in different forms.

In some embodiments, the interaction generation circuit 265 is configured to initiate an interaction with the customer 101 that is of a customer service nature at an optimal time of reaching the customer 101 based on one or more of the receptiveness metrics of the customer 101. For example, if the financial institution 140 detects fraudulent activity with respect to an account of the customer 101 (e.g., credit card fraud, identity theft, and so on), the interaction generation circuit 265 can call the customer 101 (or notify a customer service representative of the financial institution 101 to call the customer 101) to resolve the issues at an optimal time of reaching out to the customer 101, based on the receptiveness metrics of the customer 101. As another example, if an account of the customer 101 (e.g., a credit card account) is close to reaching a credit limit, the interaction generation circuit 265 can call the customer 101 (or notify a customer service representative of the financial institution 101 to call the customer 101) to notify the customer 101 of the situation at an optimal time of reaching out to the customer 101, based on the receptiveness metrics of the customer 101.

In some embodiments, the interaction generation circuit 265 is configured to utilize one or more interventions with respect to the generated interactions to increase receptiveness of the customer 101. An intervention is a mechanism related to the presentation of the offer provided by the interaction generation circuit 265 to the customer 101. In some embodiments, the intervention includes presenting an interaction using an avatar of the customer 101. For example, the avatar of the customer 101 can be an aged version of the customer 101, such that the aged avatar presents an offer to the customer 101 (e.g., via the banking client application 205). In some embodiments, the interaction (e.g., an offer for a financial product or service) generated by the interaction generation circuit 265 can provide the offer in addition to information about how the financial product or service will affect the future financials of the customer 101 (e.g., by depicting how much money the customer 101 will save by partaking in a financial product, how much more an investment portfolio of the customer 101 will grow (compared with portfolio growth if the customer 101 does not partake in the financial product), and the like).

In some embodiments, the interaction generation circuit 265 utilizes a friction index in determining presentation and transmittal of interactions. The friction index indicates a level of inconvenience for the customer 101 to receive a financial product or service, and the more inconvenient it is for the customer 101 to obtain the financial product or service, the higher the friction index and the less receptive the customer 101 is to converting the offer for the product or service. For example, if an offer for a financial product or service requires the customer 101 to physically enter a branch of the financial institution 140, then the friction index of such an offer is high and therefore receptiveness is low, and thus the interaction generation circuit 265 can refrain from sending such an offer. Conversely, if an offer for a financial product or service merely requires the customer 101 to accept the offer online, then the friction index of such an offer is low and therefore receptiveness can be high, and thus the interaction generation circuit 265 can prioritize sending such an offer over an offer that has a higher friction index associated therewith.

As shown, the customer 101 operates or is associated with the user device 110. In some arrangements, the user device 110 includes a processing circuit 202 having a processor 203 and memory 204. The processor 203 is implemented as a general-purpose processor, an ASIC, one or more FPGAs, a DSP, a group of processing components that are distributed over various geographic locations or housed in a single location or device, or other suitable electronic processing components. The memory 204 (e.g., RAM, NVRAM, ROM, Flash Memory, hard disk storage, etc.) stores data and/or computer code for facilitating the various processes described herein. Moreover, the memory 204 is or includes tangible, non-transient volatile memory or non-volatile memory. Accordingly, the memory 204 includes database components, object code components, script components, or any other type of information structure for supporting the various activities and information structures described herein.

The user device 110 is shown to include various circuits and logic for implementing the activities described herein. More particularly, the user device 110 includes one or more of a processing circuit 202, input/output circuit 205, network interface 206, banking client application 270, web application 280, email application 290, or the like. While various circuits, interfaces, and logic with particular functionality are shown, it should be understood that the user device 110 includes any number of circuits, interfaces, and logic for facilitating the functions described herein. For example, the activities of multiple circuits are combined as a single circuit and implemented on a same processing circuit (e.g., the processing circuit 202), as additional circuits with additional functionality are included, etc.

The network interface 206 is configured for and structured to establish a communication session via the communication network 120 with the financial computing system 242. Accordingly, the network interface 206 is an interface such as, but not limited to, the network interface 248.

The input/output circuit 205 is configured to receive user input from and provide information to the customer 101. In this regard, the input/output circuit 205 is structured to exchange data, communications, instructions, etc. with an input/output component of the user device 110. Accordingly, in some arrangements, the input/output circuit 205 includes an input/output device such as a display device, touchscreen, keyboard, microphone, and/or the like. In some arrangements, the input/output circuit 205 includes communication circuitry for facilitating the exchange of data, values, messages, and the like between the input/output device and the components of the user device 110. In some arrangements, the input/output circuit 205 includes machine-readable media for facilitating the exchange of information between the input/output device and the components of the user device 110. In still other arrangements, the input/output circuit 205 includes any combination of hardware components (e.g., a touchscreen), communication circuitry, and machine-readable media.

In some embodiments, the banking client application 270 is a server-based application executable on the user device 110. In this regard, the customer 101 can first download the application(s) prior to usage. In another arrangement, the banking client application 270 is coded into the memory 204 of the user device 110. In still another arrangement, the banking client application 270 is a web-based interface application. In this configuration, the customer 101 logs onto or accesses the web-based interface before usage. In this regard, the banking client application 270 is supported by a separate computing system comprising one or more servers, processors, network interface modules, etc. that transmit the applications for use to the user device 110. In certain arrangements, the banking client application 270 includes an Application Programming Interface (API) and/or a Software Development Kit (SDK) that facilitate integration of other applications. All such variations and combinations are intended to fall within the spirit and scope of the present disclosure.

The banking client application 270 is communicably coupled to the financial institution computing system 242 (e.g., the account database 250) via the network 120 and is structured to permit management of at least one account of the customer 101 via the banking client application 270. In this regard, the banking client application 270 provides displays indicative of account information such as, but not limited to, current account balances, pending transactions, transaction history, profile information (e.g., contact information), bill pay information and/or the like. Further, in some arrangements, the banking client application 270 is configured to process payments from the customer 101 to a designated recipient. For example, the banking client application 270 depicts a loan (e.g., mortgage) of the customer 101 and allows the customer 101 to pay the loan from an account (e.g., checking or savings). In some examples, a bill pay option is provided by the banking client application 270, where the bill pay option allows the customer 101 to pay his/her bills in response to user input.

As mentioned herein, via the banking client application 270, the customer 101 pays bills (e.g., mortgage, etc.), view balances, and otherwise manages their account. Accordingly and as shown, the mobile bank client application 270 includes an account information circuit 214. The account information circuit 214 is linked or otherwise coupled to one or more accounts (as stored the account database 250) held by the customer 101 and permits management of the associated accounts (e.g., transfer balances between accounts, see payment history, transactions, etc.) by communicating with the financial institution computing system 242.

In some embodiments, the web application 280 and/or the email application 290 is a server-based application executable on the user device 110. In this regard, the customer 101 can first download the applications prior to usage. In another arrangement, the web application 270 and/or the email application 290 is coded into the memory 204 of the user device 110. In still another arrangement, the web application 280 and/or the email application 290 is a web-based interface application. In this configuration, the customer 101 has to log onto or access the web-based interface before usage. In this regard, the web application 280 and/or the email application 290 is supported by a separate computing system comprising one or more servers, processors, network interface modules, etc. that transmit the application for use to the user device 110. In certain arrangements, the web application 280 and/or the email application 290 includes an API and/or a SDK that facilitate integration of other applications. All such variations and combinations are intended to fall within the spirit and scope of the present disclosure.

In some embodiments, the customer 101 accesses the web application 280 to communicate with the financial institution 140. In some embodiments, the web application 280 is a web browser for generally browsing the internet or for accessing the banking client application 265, while the banking client application 265 is a mobile application (e.g., an app that is web-based) for a mobile phone that is associated with the financial institution 140. In some embodiments, the web application 280 can be used instead of the banking client application 265 to directly interface with a web-based banking application or service. For example, the customer 101 accesses a website associated with the financial institution 140 to access a financial account of the customer 101.

In some embodiments, the banking client application 270 is configured to receive interactions (e.g., offers) from the financial institution 140 (e.g., from the interaction generation circuit 265) and display the interactions to the customer 101 via the banking client application 270 (e.g., via banners, interstitial content, native content, and so on). Similarly, in some embodiments, the web application 280 is configured to receive interactions (e.g., offers) from the financial institution 140 (e.g., from the interaction generation circuit 265) and display the interactions to the customer 101 via the web application 280 (e.g., via banners, interstitial content, native content, and so on) on a website associated with the financial institution 140. In some embodiments, the email application 290 is configured to receive interactions sent by the interaction generation circuit 265 (e.g., in the form of electronic messages).

Figures 3A, 3B:
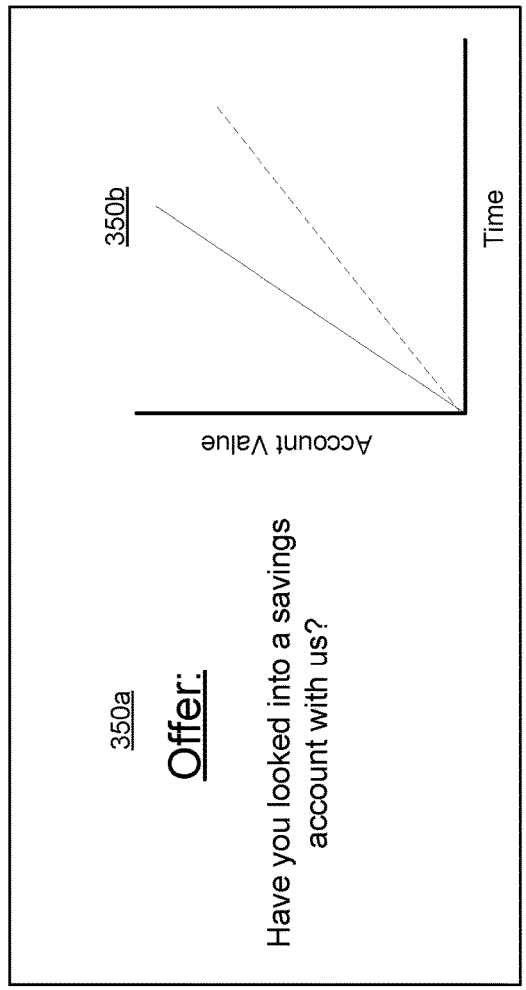
FIG. 3A is a diagram illustrating a transaction history of an account of a customer according to some embodiments.
FIG. 3B is a diagram illustrating an interaction with a customer according to some embodiments.

FIG. 3A is a diagram illustrating a transaction history 300 of an Account A of the customer 101 according to some embodiments. FIG. 3B is a diagram illustrating an interaction 350 with the customer 101 according to some embodiments.

Referring to FIG. 3A, the transaction history 300 depicts a plurality of individual transactions made by the customer 101 with respect to Account A. As shown, the customer 101 is shown to make multiple transactions regarding public transaction (e.g., once in the morning and once in the evening), indicating that the customer 101 is commuting during this time. Accordingly, as discussed above, a relatively low receptiveness metric can be attributed to the customer 101 for the morning and during the day (e.g., when the customer 101 is likely travelling and in the office), while a relatively high receptiveness metric can be attributed to the customer 101 for the evening (e.g., when the customer 101 is likely at home). In addition, the transaction history indicates an online purchase made by the customer 101, which indicates that the customer 101 exhibits some technical savviness, and so the receptiveness metric for the more technical channels of communication (e.g., via a mobile app or website associated with the financial institution 140) can be relatively high. Furthermore, the transactions history indicates that the customer 101 made multiple purchases in the Bahamas, which indicates that the customer 101 is on vacation during this time, and so a relatively low receptiveness metric to the customer 101.

Referring to FIG. 3B, the interaction 350 includes an offer 350*a* and an intervention 350*b*. The interaction 250 can be sent to the customer 101 at a time, location, mode, etc. having associated with a relatively high receptiveness metric, so that the customer 101 has a high likelihood of seeing and interacting with the interaction 350. The interaction 250 can also include data visualizations in order to improve the receptiveness metrics. The offer 350*a* includes a message asking the customer 101 to look at a savings account provided by the financial institution 140. In addition, the intervention 350*b* includes a graph illustrating a value that the offered savings account will provide over time, illustrating that the savings account (solid line) will outperform the customer's current account (dashed line) over time. Accordingly, by providing this illustration, the intervention 350*b* can increase receptiveness of the interaction 350 as being part of the interaction 350 itself.

Figure 4:
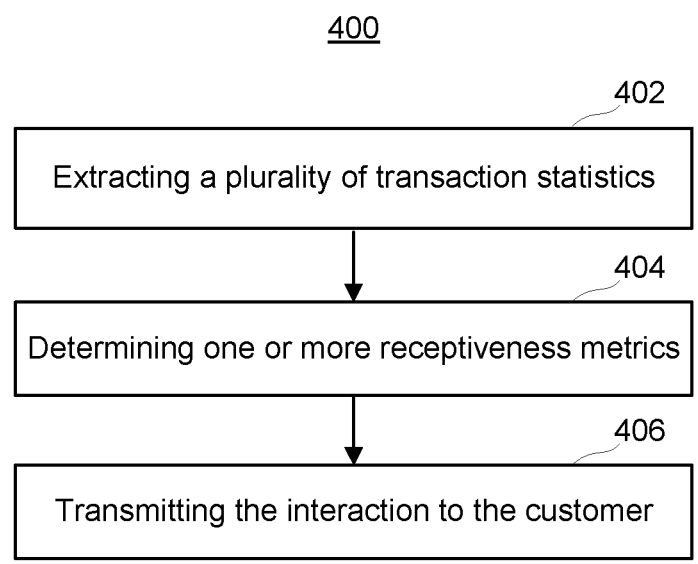
FIG. 4 is a flowchart of a method for determining customer receptiveness metrics according to some embodiments.

FIG. 4 is a flowchart of a method 400 for determining customer receptiveness metrics according to some embodiments. The method 400 is performed by a financial institution computing system (e.g., the financial institution computing system 140 of FIGS. 1 and 2).

In some embodiments, at step 402, an account database storing transaction statistics of a customer is accessed and the transaction statistics are extracted. In certain embodiments, the account database is part of a financial institution computing system (e.g., the account database 250 of the financial institution computing system 140). In certain embodiments, the account database is accessed by a receptiveness metrics circuit of the financial institution computing system (e.g., the receptiveness metrics circuit 260). In certain embodiments, the transaction information of the customer includes information about transaction amount, transaction date, transaction party, transaction location, and the like.

In some embodiments, at step 404, one or more receptiveness metrics are determined. In some embodiments, the one or more receptiveness metrics indicate likelihoods of the customer converting an interaction from the financial institution. In certain embodiments, the one or more receptiveness metrics are based on a time of day, a location of the customer, a mode of the customer, and a technical savviness of the customer.

In certain embodiments, at step 406, the interaction is transmitted to the customer. In certain embodiments, the interaction includes an intervention in a presentation of the interaction, and the intervention is configured to increase receptiveness of the customer to the interaction. In some embodiments, the interaction includes an offer for a financial product or service provided by the financial institution.

Certain embodiments include non-transitory computer readable media having computer-executable instructions embodied therein that, when executed by financial institution computing system 140, including certain instructions executed by receptiveness metrics circuit 260 and interaction generation circuit 265, causes the financial institution computing system 140 to perform operations described herein, or any operations that may be performed by any embodiments of financial institution computing system 140.

Certain embodiments described herein have been described with reference to drawings. The drawings illustrate certain details of embodiments that implement example systems, methods, non-transitory computer readable media having computer-executable instructions, and programs described herein. However, describing example embodiments with drawings should not be construed as imposing on the disclosure any limitations that may be present in the drawings. For example, elements shown in drawings may or may not be included in embodiments of the systems and methods herein.

It should be understood that no claim element herein is to be construed under the provisions of 35 U.S.C. § 112(f), unless the element is expressly recited using the phrase "means for."

It should be further understood that "or" should be construed as inclusive or, such that, for example, "A or B" means A, B, or A and B, and for example, "A, B, or C" means A, B, C, or any combination thereof (e.g., A and B, A and C, B and C).

It should be further understood that a database that may be described as two or more databases in the example embodiments or claims may be implemented as one database. It should be further understood that a database that may be described as one database in the example embodiments or claims may be implemented as two or more databases. It should be further understood that a circuit that may be described as two or more circuits in the example embodiments or claims may be implemented as one circuit. It should be further understood that a circuit that may be described as one circuit in the example embodiments or claims may be implemented as two or more circuits.

It should be further understood that "a" and "an" are not limited to a single instance and should be construed as "one or more," such that, for example, a database "storing information of a transaction" is a database storing information of one or more transactions.

As used herein, the term "circuit" may include hardware structured to execute the functions described herein. In some embodiments, each respective "circuit" may execute, or include machine-readable media for configuring the hardware to execute, the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices, including but not limited to devices such as those described herein, any other input devices capable of performing a similar function, and any other input devices that may be used with a computing device. Comparatively, the term "output device," as described herein, may include any type of output device or output devices, including but not limited to devices such as those described herein, any other output devices capable of performing a similar function, and any other output devices that may be used with a computing device.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined and form part of the same step, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of example embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain examples of the disclosure and its practical application to enable one skilled in the art to utilize various embodiments and with various modifications as may be suited to any particular use contemplated. Other substitutions, modifications, changes, and omissions may be made in the design, operating conditions, and arrangement of the embodiments without departing from the scope of the present disclosure as expressed in the appended claims.

What is claimed is:

1. A financial institution computing system comprising:
   an account database comprising a plurality of transaction parameters with respect to a financial account of a customer;
   a receptiveness metrics circuit structured to:
      extract the plurality of transaction parameters from the account database, the transaction parameters including at least one financial transaction record, and indicative of a mode of the customer; and
      determine one or more receptiveness metrics attributed to the customer based on the mode of the customer, the one or more receptiveness metrics indicating likelihoods of the customer converting an interaction from the financial institution, wherein the interaction includes an avatar that is an aged version of the customer; and
   an interaction generation circuit structured to:
      transmit the interaction to the customer at an optimal time based on the one or more receptiveness metrics.

2. The financial institution computing system of claim 1, wherein the receptiveness metrics circuit is further structured to:
   extract a transaction location parameter from the plurality of transaction parameters,
   wherein the one or more receptiveness metrics is based on the transaction location.

3. The financial institution computing system of claim 1, wherein a lower score of the one or more receptiveness metrics is associated with a work place of the customer, while a higher score of the one or more receptiveness metrics is associated with a home of the customer.

4. The financial institution computing system of claim 1, wherein the receptiveness metrics circuit is further structured to:
  determine the mode of the customer based on transaction locations of the plurality of transaction parameters,
  wherein the mode of the customer includes at least one of a work mode, a leisure mode, a vacation mode, and a stressed mode.

5. The financial institution computing system of claim 1, wherein the receptiveness metrics circuit is further structured to:
  determine a technical savviness of the customer based on a frequency of online transactions and a frequency of in-store transactions from the transaction parameters,
  wherein the one or more receptiveness metrics is based on the technical savviness of the customer.

6. The financial institution computing system of claim 1, wherein the interaction includes an intervention in a presentation of the interaction, the intervention is structured to increase receptiveness of the customer to the interaction, and the intervention includes information pertaining to how the interaction will financially provide value to the customer in the future.

7. The financial institution computing system of claim 1, wherein the interaction includes an offer for a financial product or service provided by the financial institution.

8. A method performed by a financial institution computing system, the method comprising:
  extracting, by a receptiveness metrics circuit, a plurality of transaction parameters from an account database, the transaction parameters including at least one financial transaction record, and indicative of a mode of the customer;
  predicting, by the receptiveness metrics circuit, the mode of the customer based on the extracted transaction parameters and at least one of a location of the customer and a mode of transportation associated with the financial transaction record;
  determining, by the receptiveness metrics circuit, one or more receptiveness metrics attributed to the customer based on the mode of the customer, the one or more receptiveness metrics indicating likelihoods of the customer converting an interaction from the financial institution, wherein the interaction includes an avatar that is an aged version of the customer;
  determining, by the receptiveness metrics circuit, a confidence level for the mode of the customer based whether one or more of the plurality of transaction parameters confirm or disprove the predicted behavior; and
  transmitting, by an interaction generation circuit, the interaction to the customer at an optimal time based on the one or more receptiveness metrics.

9. The method of claim 8, wherein a lower score of the one or more receptiveness metrics is associated with a day time, while a higher score of the one or more receptiveness metrics is associated with a night time.

10. The method of claim 8, further comprising extracting, by the receptiveness metrics circuit, a transaction location parameter from the plurality of transaction parameters, wherein the one or more receptiveness metrics is based on the transaction location.

11. The method of claim 8, wherein a lower score of the one or more receptiveness metrics is associated with a work place of the customer, while a higher score of the one or more receptiveness metrics is associated with a home of the customer.

12. The method of claim 8, further comprising:
  determining, by the receptiveness metrics circuit, the mode of the customer based on transaction locations of the plurality of transaction parameters,
  wherein the mode of the customer includes at least one of a work mode, a leisure mode, a vacation mode, and a stressed mode.

13. The method of claim 8, wherein a lower score of the one or more receptiveness metrics is associated with a vacation mode of the customer, while a higher score of the one or more receptiveness metrics is associated with a leisure mode of the customer.

14. The method of claim 8, further comprising:
  determining, by the receptiveness metrics circuit, a technical savviness of the customer based on a frequency of online transactions and a frequency of in-store transactions from the transaction parameters,
  wherein the one or more receptiveness metrics is based on the technical savviness of the customer.

15. The method of claim 14, further comprising determining, by the receptiveness metrics circuit, the technical savviness of the customer based on one or more of a browser, a browser version, an operating system, and an operating system version used by the customer.

16. The method of claim 8, wherein the interaction includes an intervention in a presentation of the interaction, and the intervention is structured to increase receptiveness of the customer to the interaction.

17. The method of claim 16, wherein the intervention includes information pertaining to how the interaction will financially provide value to the customer in the future.

18. The method of claim 8, wherein the interaction includes an offer for a financial product or service provided by the financial institution.

19. A non-transitory computer readable media having computer-executable instructions embodied therein that, when executed by a receptiveness metrics circuit and an interaction generation circuit of a financial institution computing system, causes the financial institution computing system to perform operations, the operations comprising:
  extracting, by the receptiveness metrics circuit, a plurality of transaction parameters from an account database, the transaction parameters including at least one financial transaction record, and indicative of a mode of the customer;
  predicting, by the receptiveness metrics circuit, the mode of the customer based on the extracted transaction parameters and at least one of a location of the customer and a mode of transportation associated with the financial transaction record;
  determining, by the receptiveness metrics circuit, one or more receptiveness metrics attributed to the customer based on the mode of the customer, the one or more receptiveness metrics indicating likelihoods of the customer converting an interaction from the financial institution, wherein the interaction includes an avatar that is an aged version of the customer;
  determining, by the receptiveness metrics circuit, a confidence level for the mode of the customer based whether one or more of the plurality of transaction parameters confirm or disprove the predicted behavior; and transmitting, by the interaction generation circuit, the interaction to the customer at an optimal time based on the one or more receptiveness metrics.

20. The non-transitory computer readable media of claim 19, wherein the interaction includes an intervention in a presentation of the interaction, the intervention is structured to increase receptiveness of the customer to the interaction, and the intervention includes information pertaining to how the interaction will financially provide value to the customer in the future.

* * * * *